United States Patent [19]

Kraeft et al.

[11] 4,091,946
[45] May 30, 1978

[54] TRUCK-MOUNTED CABLE REEL HANDLING APPARATUS

[76] Inventors: Robert W. Kraeft, 10581 E. Dorado Ave., Englewood, Colo. 80110; John B. Lloyd, 2083 Pommard Dr., Creve Couer, Mo. 63141

[21] Appl. No.: 664,770

[22] Filed: Mar. 8, 1976

[51] Int. Cl.² .............................................. B60P 1/48
[52] U.S. Cl. ............................... 214/518; 214/77 R; 214/DIG. 4; 242/86.5 R; 242/128; 294/88
[58] Field of Search ............... 214/77 R, 518, DIG. 4, 214/138 E; 74/89.21; 242/86.5 R

[56] References Cited

U.S. PATENT DOCUMENTS

| | | | |
|---|---|---|---|
| 2,121,121 | 6/1938 | Dempster | 214/75 R |
| 2,722,102 | 11/1955 | Pilch | 214/138 E X |
| 2,867,390 | 1/1959 | Anrig | 242/86.5 |
| 3,012,684 | 12/1961 | Sexton et al. | 214/302 |
| 3,027,028 | 3/1962 | Brown | 214/302 |
| 3,091,413 | 5/1963 | Leithiser | 242/86.7 |
| 3,165,214 | 1/1965 | Young | 214/77 R |
| 3,167,195 | 1/1965 | Jensen et al. | 214/302 |
| 3,325,118 | 1/1967 | Hall | 242/86.5 |
| 3,702,662 | 11/1972 | Davieau | 214/302 |
| 3,732,997 | 5/1973 | Reavis et al. | 214/302 |
| 3,820,673 | 6/1974 | McVaugh | 214/518 |
| 3,938,671 | 2/1976 | Lewey et al. | 214/DIG. 4 |

FOREIGN PATENT DOCUMENTS 224,765   9/1959   Australia .................... 214/138 E Primary Examiner—Robert G. Sheridan
Attorney, Agent, or Firm—John E. Reilly

[57] ABSTRACT

Cable reels are loaded, unloaded, transferred or otherwise handled relative to the flatbed of a vehicle by a pivotally mounted lift assembly which includes a main rotary shaft having two or more extended lift arms rigidly attached in a generally U-shaped configuration. The main rotary shaft, when attached along one edge of the flat bed, is capable of pivoting through 180° rotation by hydraulic rams or the like, and the lift arms include an arrangement for securing the cargo outwardly of the shaft with hydraulically actuated gripper finger arrangements. Arrangement of a plurality of lift assemblies in tandem so that the extremities of the lift arms are on intersecting arcs enables the cargo to be lifted from the ground surface onto the flatbed and transferred to different selected positions. Power winches appropriately positioned or peripheral engagement of cable reel containers allow rotary cargo for cable reel winding or unwinding.

8 Claims, 15 Drawing Figures

U.S. Patent May 30, 1978 Sheet 1 of 5 4,091,946
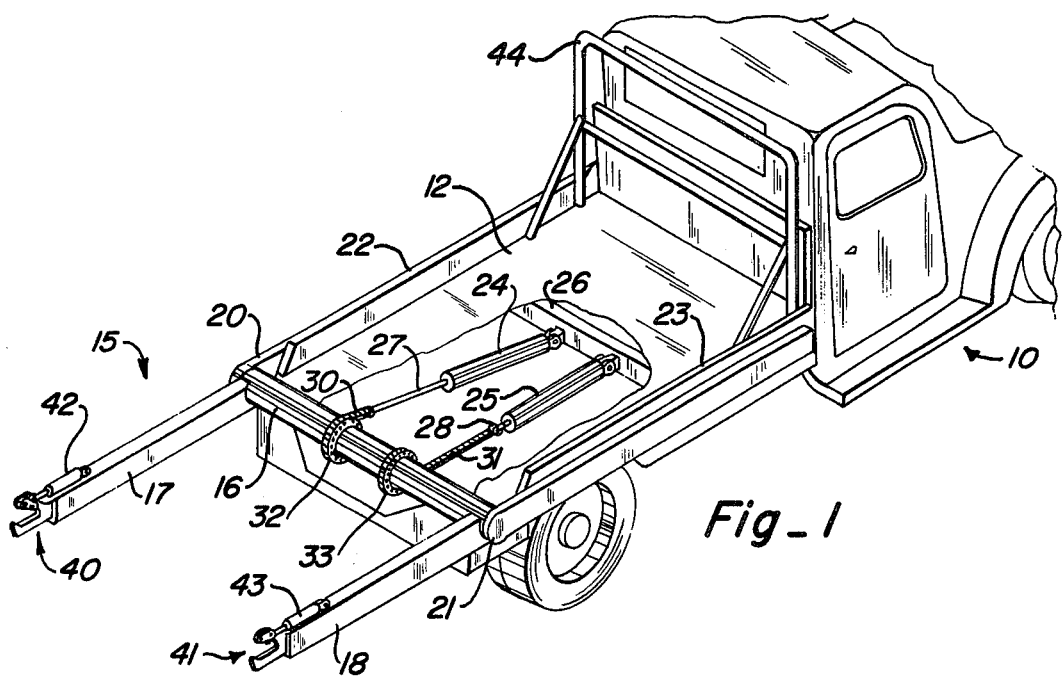
Fig_1
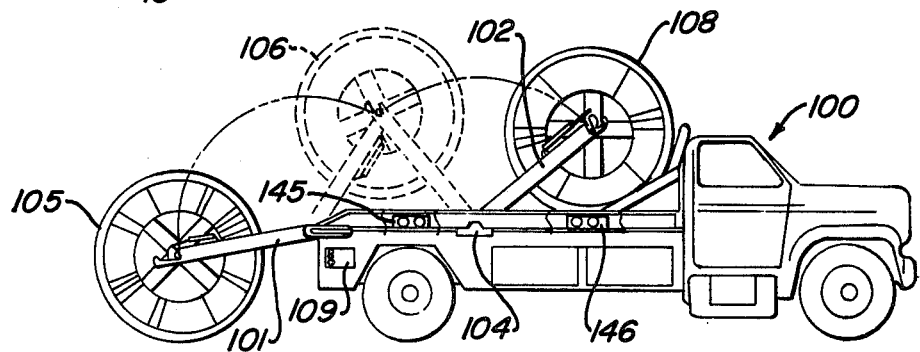
Fig_2
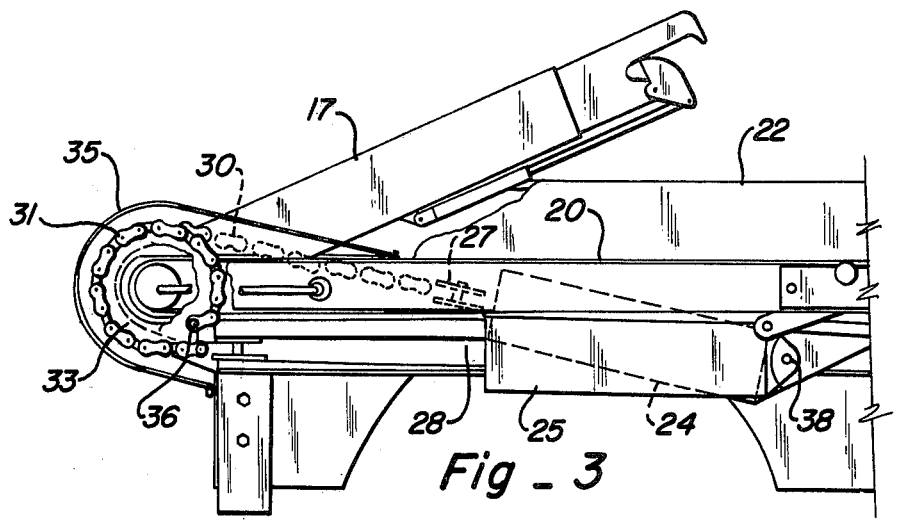
Fig_3

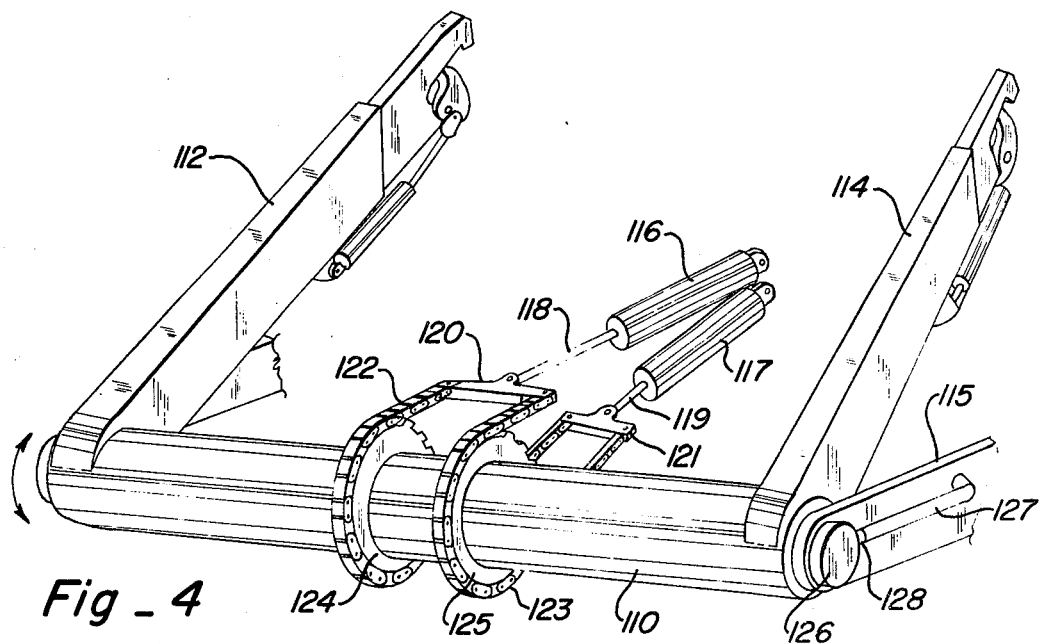
Fig_4
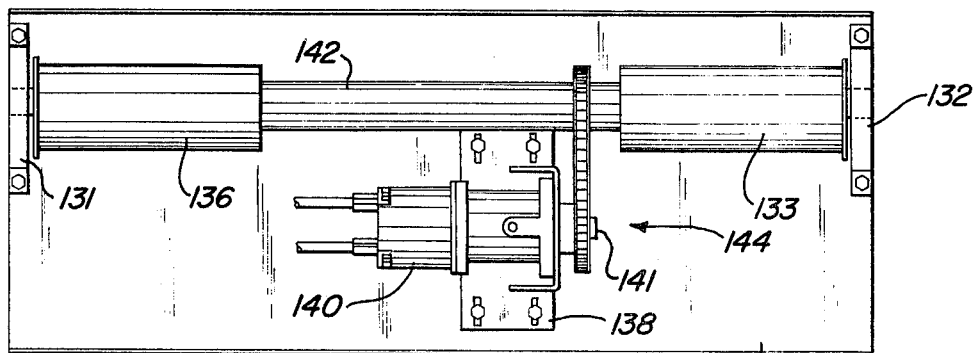
Fig_5
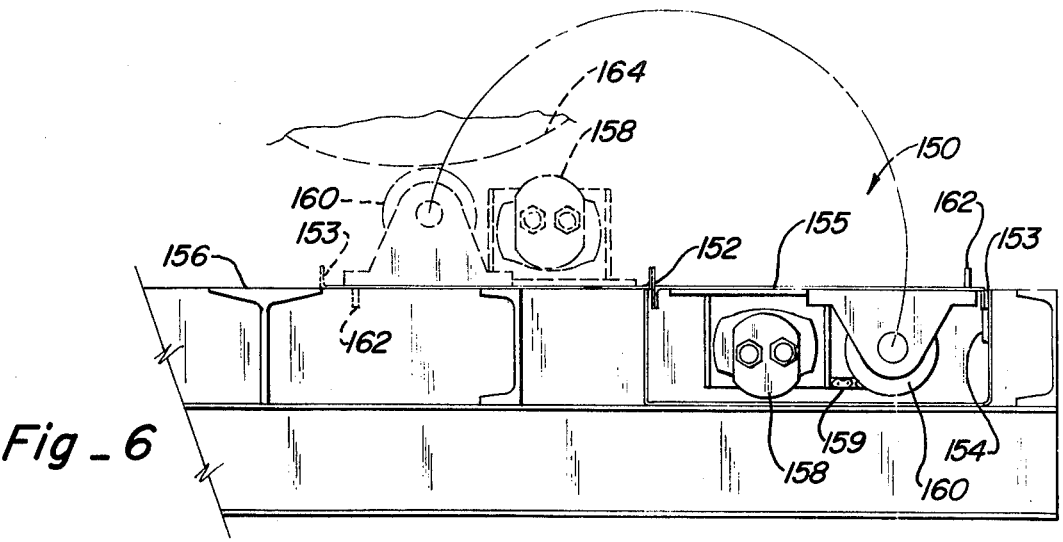
Fig_6

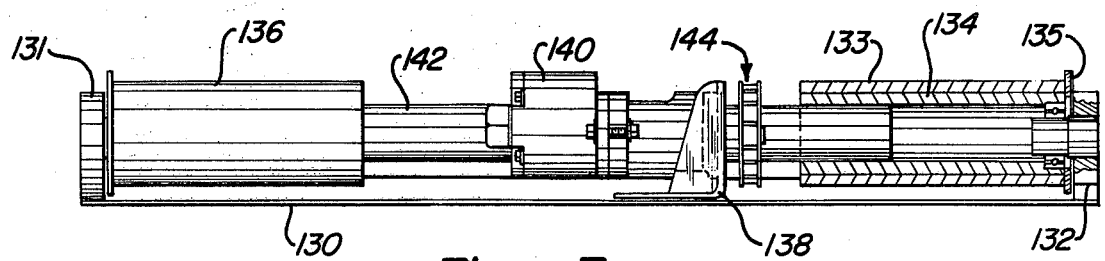
Fig_7
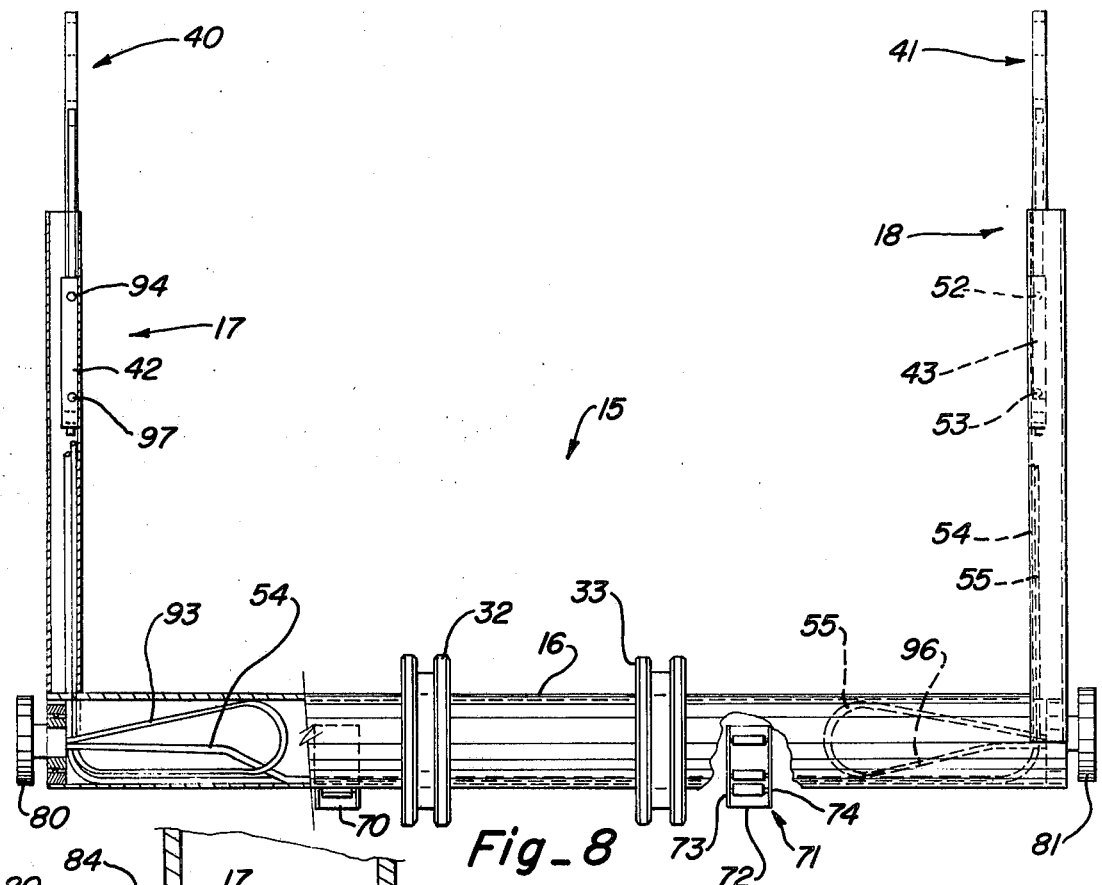
Fig_8
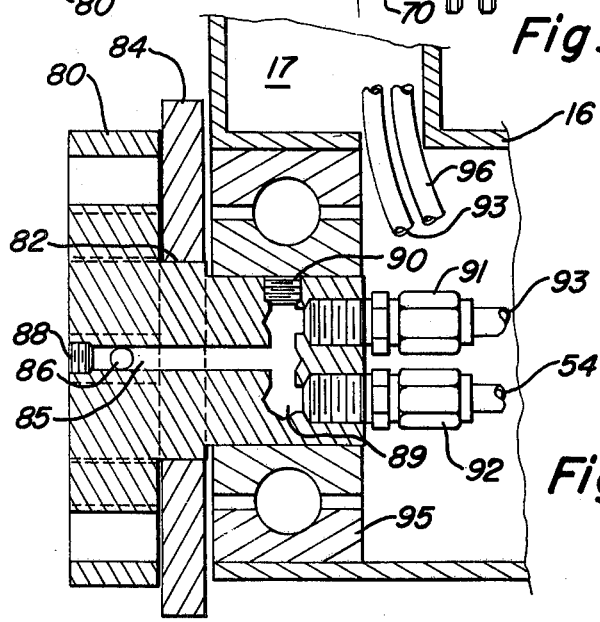
Fig_9
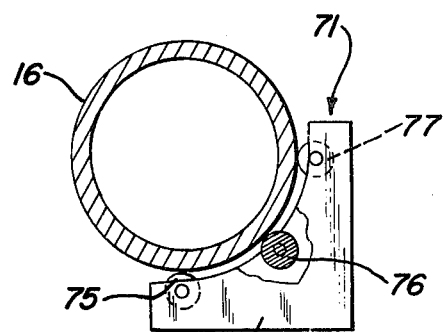
Fig_10

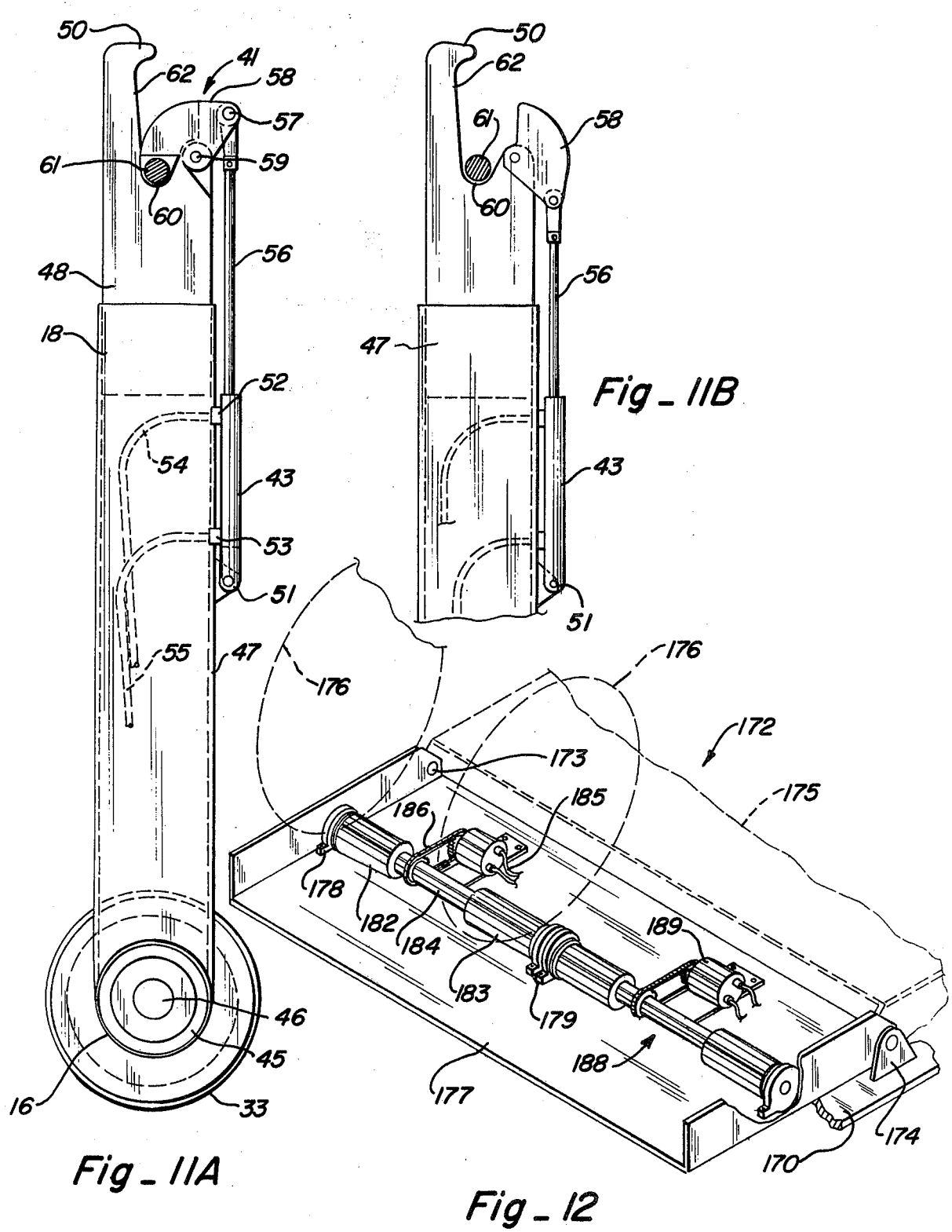

TRUCK-MOUNTED CABLE REEL HANDLING APPARATUS

BACKGROUND OF THE INVENTION

The present invention relates to methods and apparatus for transferring and positioning bulky cargo relative to a storage area. More particularly, the present invention relates to methods and apparatus for loading and unloading bulky cargo onto a flatbed storage area such as the platform of a truck. Although not necessarily limited thereto, the present invention is particularly useful for loading and unloading cable reels as are employed by utility companies and the like onto a transporting vehicle and further for controlling the positioning and feeding or winding of cable relative to those reels.

Bulky and awkward cargo which cannot be lifted manually frequently must be transferred and positioned from a surface such as the ground, a roadway or the like to a platform. Wherever the transfer and location of the cargo is effected at a single location, cranes, derricks or similar devices can be located to effect the transfer and positioning results. However, with the mobility of vehicles for cargo carrying purposes and the diverse locales in which unloading, loading and transferring must be performed, it is impossible to resort to cranes or derricks or at least undesirable to modify the vehicle so as to include such apparatus. Thus, various efforts have been directed towards developing relatively self-contained assemblies on the vehicle for loading, unloading and otherwise handling such awkward cargo. Typically, such systems employ some arrangement on the cargo itself for simplifying its handling such as handles, spindles or other grippable structure for cooperating with the vehicle mechanism to allow positioning and transfer control.

The transfer and handling problems have been attacked for trash or refuse containers by a wide variety of arrangements. For instance, U.S. Pat. No. 2,121,121 by Dempster employs a container gripping framework along with a chain driven and scaffold mounted configuration for lifting the container and tilting it for dumping when it reaches the height of the scaffold. A somewhat similar approach is shown in U.S. Pat. No. 3,732,997 by Reavis et al. which likewise includes an enveloping gripping assembly for securing a handlebar on the container with the entire chain-driven elevator mechanism being outwardly pivotable for dumping purposes. Other refuse container apparatus has been suggested using pivoted lift arms which are coupled to linear hydraulic actuators such as in U.S. Pat. Nos. 3,012,684 by Sexton et al., 3,027,028 by Brown, 3,167,195 by Jensen et al. and 3,702,662 by Davieau. Jensen et al. engages the container by outwardly extending arms and retaining nubs whereas the Sexton et al., Brown and Davieau devices employ various arrangements of clasping gripper arrangements for spindles on the container.

Somewhat different approaches have been suggested for problems associated with transferring bulky cable reels relative to a transport vehicle platform. In this regard, one arrangement for loading a cable reel is shown in U.S. Pat. No. 3,091,413 by Leithiser wherein the cable reel is mounted between a pair of generally triangular shaped side arm assemblies which are thence pivoted so as to load and unload the reel between a vertically oriented position and the surface. Yet another arrangement is suggested in U.S. Pat. No. 2,867,390 by Anrig wherein an arrangement of pivotal side arms are interconnected with a winch cable so that the cable can be pivoted onto guide tracks. Anrig suggests loading more than one reel onto the trailer by rolling the reels into positions along a vertical frame where they can be clamped and thence attaching another reel to the cable controlled pivotal assembly. Services such as those of Anrig and Leithiser are of little value for situations wherein it is necessary to load and unload reel devices between positions which require the lifting mechanism to accommodate pivoting which even approaches 180°. The prior art devices which can accommodate such pivotal loading and unloading through approximately 180° have used offset linkages such as those suggested in U.S. Pat. Nos. 3,165,214 by Young and 3,325,118 by Hall. Young and Hall type mechanisms utilize pivotally mounted but linearly operable hydraulic rams coupled to offset pivot linkages in order to obtain rotation of approximately 180°.

Despite the various developments in the prior art, there has been a continuing need for apparatus and methods which can allow loading of cargo through rotation of approximately 180° without resort to offset linkages. Further, there has been a continuing need for apparatus and methods which can accommodate handling and positioning of awkward cargo from positions between a surface and multiple locations relative to a vehicle platform. Still further, there has been a continuing need for a method and apparatus particularly useful for controlled winding and payout of cables on a transport vehicle platform after loading thereon. Such devices must be configured with minimal, reliably operable components for dependable long-term and heavy duty usage.

SUMMARY OF THE INVENTION

Although not necessarily so limited, the present invention will be described herein with emphasis upon its adaptability for loading, unloading, handling and controlling of spindle mounted heavy cable reels relative to the flatbed or platform of a truck. As will likewise be readily apparent from the subsequent descriptions, the present invention is particularly advantageous in that minimum components are required and cooperatively interrelate in a manner which insures long term reliable usage despite relatively adverse environments.

Apparatus in accordance with this invention for loading and unloading spindle mounted type cargo such as cable reels and the like relative to flatbeds such as the platform of a vehicle employs a lift assembly which includes an elongated shaft having two or more arms or lift limbs rigidly attached thereto in spaced relation along the shaft. Each arm is adapted to releasably receive a cargo spindle at points remote from the shaft. The arms extend perpendicular to the length of the shaft and in parallel relation to each other thereby defining a generally U-shaped configuration. The shaft which has a circular element rigidly attached thereto in radially surrounding relation to its central axis, is mounted with its axial length parallel to and rotatable with respect to the surface of the flatbed. A power source is attached in fixed relation to the flatbed and has a power output member coupled to the circular element on the shaft for controlling the rotary positioning of the shaft and thus the lift assembly. With the shaft attached in proximity to a vehicle platform edge, the lift assembly is actually capable of rotation greater than 180°.

By using sprocket gears and coupling chain arrangements with hydraulic rams, electrical control can be employed so that the ram pistons are coupled for oppositely directed, powering or braking of rotation of the lift arm and shaft assembly, and the lift arms can include hydraulically actuated spindle gripper arrangements on the outer ends thereof.

Another advantageous feature of the present invention is that a plurality of the lifting assemblies can be used in tandem along the platform with each assembly including an elongated shaft with lift limbs or arms attached thereto. Rotary power producing devices are attached in fixed relation to the flatbed and coupled to introduce rotary power to respective shafts which are effectively spaced in parallel relation along the flatbed. By positioning one of the shafts in proximity to the edge of the flatbed and in spaced alignment and parallel to the other shaft with the spacing being arranged to accomodate radial overlap of the movement of the releasable securing devices on the arms, the cargo items can be secured by the releasable securing devices and rotatably transferred from assembly to assembly over the flatbed.

A still further feature of the present invention relates to the use of rotary drive winch assemblies positioned on the flatbed so as to engage the circumference of the cable reels once transferred onto the vehicle platform. Such rotary winch assemblies can be hydraulically powered and further can be pivotally mounted for storage out of engagement with the cable reel perimeter or into perimeter engagement as needed.

It is therefore an object of the present invention to provide a novel and improved apparatus and method for loading, unloading and positioning heavy cargo between a surface and a storage platform.

Another object of the present invention is to provide a novel and improved apparatus and method for pivotally loading and unloading awkward and heavy cargo through rotation of 180° as between a ground surface and an elevated storage or vehicle platform.

A further object of the present invention is to provide a novel and improved apparatus and method for transferring awkward cargo between a surface and any of multiple positions arrayed along a storage platform, flatbed of a vehicle or the like.

Yet another object of the present invention is to provide a novel and improved apparatus and method for applying rotary winch power to the perimeter of a rotary mounted cargo which has been loaded onto a flatbed containing the rotary winch assembly.

A still further object of the present invention is to provide a novel and improved apparatus and method for utilizing hydraulic apparatus for loading, unloading, handling and controlling awkward cargo in a configuration which requires minimal but reliably cooperative components.

A still further object of the present invention is to provide a novel and improved apparatus and method for quickly and easily handling spindle mounted cargo as between a vehicle platform and a surface horizontally displaced from the platform.

The foregoing and other objects, features and advantages of the present invention will be more readily apparent in view of the following detailed description of exemplary preferred embodiments of this invention.

BRIEF DESCRIPTION OF THE DRAWINGS

FIG. 1 is a partially broken perspective view of a vehicle including a hydraulic ram actuated cargo loading apparatus.

FIG. 2 is a side plan view of a vehicle incorporating multiple lift limb assemblies for loading and transferring cargo between a surface and multiple positions on the vehicle platform.

FIG. 3 is a side partially sectioned and broken view of the bidirectional hydraulic ram actuated mechanism as shown in FIG. 1.

FIG. 4 shows a potential modification of the present invention employing a pair of hydraulic rams coupled for bidirectional pivotal powering of a lift limb assembly.

FIG. 5 is a top plan view of power roller winch assembly.

FIG. 6 shows a side view illustrating two positions of a pivotally storable powered roller winch assembly.

FIG. 7 is a partially sectioned front view of the FIG. 5 winch assembly.

FIG. 8 is a front view in partial section of a lift limb assembly.

FIG. 9 is a section view of the hydraulic coupling hub useful in the FIG. 8 apparatus.

FIG. 10 is a side sectioned and partially broken view of a bearing mount assembly for the rotary shaft of the FIG. 8 lift limb assembly.

FIGS. 11A and 11B show the details of a typical lift limb particularly showing the cargo handle gripper jaws in open and closed positions.

FIG. 12 is a broken perspective view of a power roller winch assembly adapted for independently controlling two cable reels.

DETAILED DESCRIPTION OF THE PREFERRED EMBODIMENTS

Figure 13:
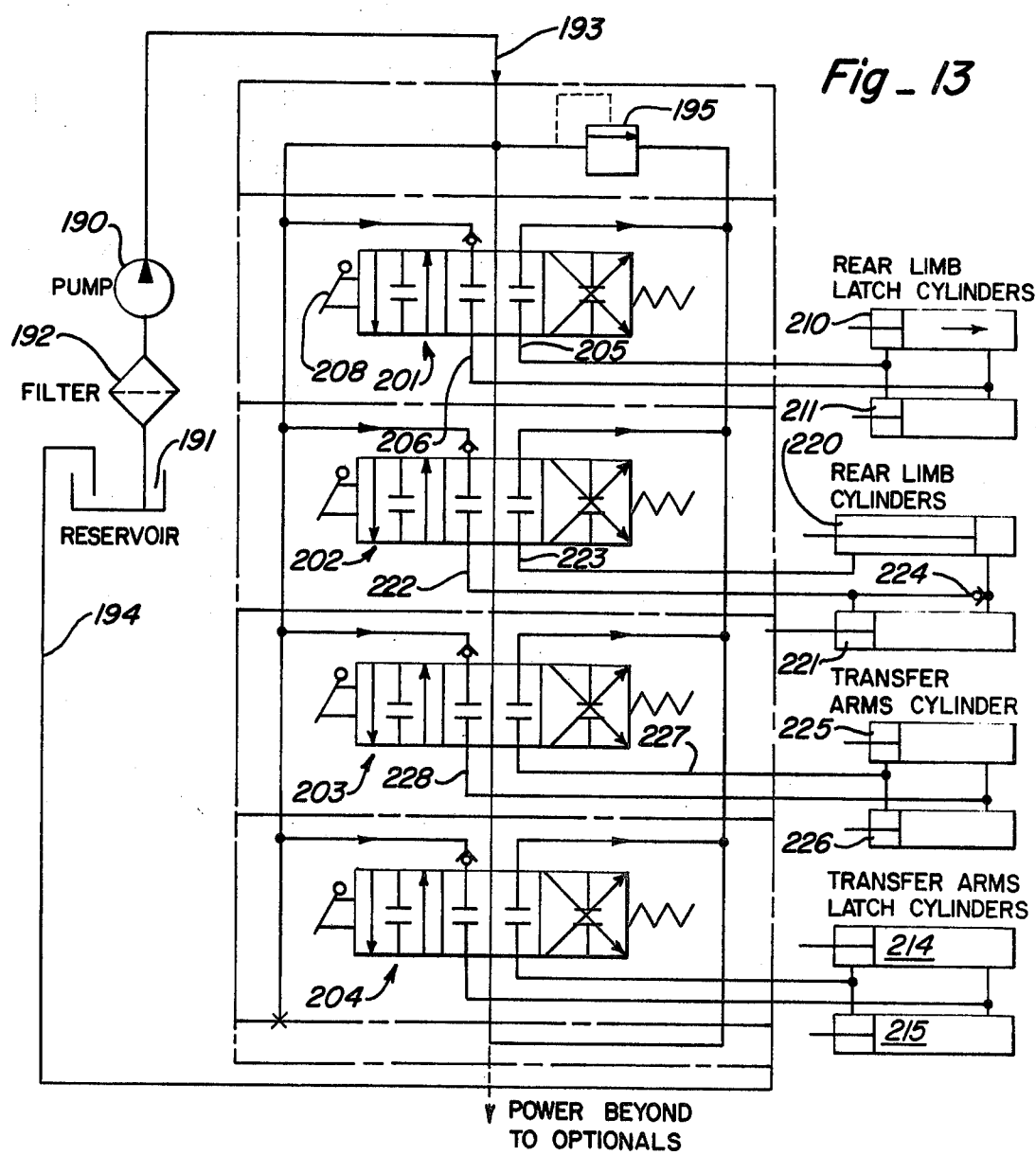
FIG. 13 is a schematic diagram of the hydraulic circuit useful for a double lift limb control arrangement.

A rear perspective view of a truck 10 is presented in FIG. 1 with portions of the flatbed or platform 12 broken away to expose the actuating elements for the loading and unloading lift limb assembly 15. Assembly 15 provides the loading, unloading and handling operations and is comprised of a main shaft 16 with lift limbs or side arms 17 and 18 rigidly attached thereto in outwardly extending parallel relation in a generally U-shaped configuration. Vehicle 10 includes a pair of outwardly extending beams 20 and 21 each of which has a respective end of shaft 16 rotatably mounted thereto. A pair of side boards 22 and 23 are positioned outwardly of lift limbs 17 and 18 so that lift limbs 17 and 18 can pivot into positions interiorly of side boards 22 and 23.

A pair of hydraulic rams 24 and 25 are pivotally secured at one end thereof to a crossbeam 26. The extendible piston members 27 and 28 of the rams are secured to one end of respective chains 30 and 31. Chains 30 and 31 likewise circumferentially engage sprocket gears 32 and 33 which are rigidly attached to shaft 16.

The bidirectional drive provided by hydraulic rams 24 and 25 in conjunction with chains 30 and 31 can best be seen in the side section and partially broken view of FIG. 3. A protective housing 35 encloses both sprocket gears 32 and 33, the positioning of the piston members 27 and 28 being illustrated in FIG. 3 as after the lift limbs have been rotated outwardly from platform 12 through approximately 180°. As is clearly evident in FIG. 3, chain 31 not only circumferentially engages sprocket gear 33 but is further pinned to sprocket 33 at pin 36. Correspondingly chain 30 is attached to piston 24 in circumferential engagement with sprocket gear 32, not visible in FIG. 3, and is likewise pinned to sprocket gear 32 but in an opposite circumferential direction from chain 31. Thus, by applying hydraulic pressure to ram 24 so as to withdraw piston 27 and concurrently exhausting hydraulic pressure from ram 25, shaft 16 and lift arms 17 and 18 as shown in FIG. 1 will be caused to rotate to the position generally depicted in FIG. 3.

As mentioned, hydraulic cylinders or rams 24 and 25 preferably are pivotally mounted to crossbeam 26 at the rear thereof, such as, by pivot pin 38 for ram 25 as shown in FIG. 3. Although cylinder 25 is mounted so that piston 28 is generally horizontal, cylinder 24 is mounted in a somewhat downwardly angled orientation to its tangential engagement with sprocket gear 32 so that chain 30 and cylinder 24 can be substantially located below the floor of the storage area for the flatbed 12. Note that protective housing 35 preferably extends rearwardly so as to completely enclose the opening in platform 12 through which chain 30 passes.

The outer extremities of lift limbs 17 and 18 are provided with tandemly actuable spindle gripper assemblies 40 and 41, respectively, shown as controlled by hydraulic cylinders or rams 42 and 43. Thus, a spindle or other grippable extension of the cargo can be placed in assemblies 40 and 41, the hydraulic cylinders 42 and 43 concurrently actuated so as to grip the cargo spindles and rams 24 and 25 appropriately energized so that the cargo is pivoted from the surface onto the storage area of flatbed 12. A framework 44 on the forward end of flatbed 12 nestingly receives the cable reel cargo and protects the cab of vehicle 10. Suitable hydraulic lines, not shown in FIGS. 1 and 3, are provided for actuating and exhausting rams 24, 25, 42 and 43; and the selection levers and hydraulic power source may be positioned for external access along the sides of flatbed 12 or even within the cab of the vehicle 10. If desired, different numbers of lift limb arms can be employed, and for instance, a third limb extending from the middle of shaft 16 and in parallel relation to lift limbs 17 and 18 may be included which could be especially useful for loading, unloading and handling pairs of cable reels.

The details of the lift limb assembly 15, the supporting structure therefor and hydraulic interconnections are illustrated in FIGS. 8-11. FIG. 11A is a side view of assembly 15 with the end supports removed. However, support bearing 45 is shown in place with the central bore 46 therethrough for receiving the mounting cap as will be described subsequently. The lower portion 47 of lift limb 18 is of a generally rectangular configuration and has an extension arm 48 rigidly attached at the outer end thereof forming an outward finger portion 50 for the gripper assembly 41. Hydraulic cylinder 43 is pivotally attached at 51 to lower section 47 of arm 18. A pair of hydraulic connections 52 and 53 slidingly pass through the wall of arm 18 and are coupled to respective input lines 54 and 55 so that the cylinder 43 is free to rotate about pin 51. The plunger 56 of hydraulic cylinder 43 is pivotally connected at 57 to gripper member 58 which is in turn pivotally attached to upper portion 48 of arm 18 at pin 59. Actuation of cylinder 43 so as to retract plunger rod 56 causes gripper finger 58 to pivot outwardly because of the offset pivot connections between pins 57 and 59 thereby opening the gripper jaw assembly as is generally illustrated in FIG. 11B. That is, with the rod 56 retracted within 43, gripper plate 58 pivots outwardly into the position shown in FIG. 11B thereby opening notch 60 so that the spindle 61 can be inserted therein. Hydraulic cylinder 43 is then actuated so as to force extending rod 56 outwardly to pivot gripper plate 58 into the engaging relation over cargo spindle or handle 61 as shown in FIG. 11A.

Note that the outer finger 50 of upper arm portion 48 prevents the spindle 61 from rolling out of the notch 60 when arm 18 is horizontal or somewhat below horizontal. The spindle can be placed against the inner surface 62 which typically is facing vertically upon initial loading and the pivoting of the lift limbs can be commenced until positioned slightly above horizontal. At that point, spindle 61 will roll completely into notch 60 and hydraulic cylinder 43 then actuated to clamp spindle 61 via gripper plate 58 for pivoting onto the storage area of the flatbed or truck platform. Although the description for FIGS. 11A and 11B has concentrated upon the structure of lift limb 18, it will be readily apparent that lift limb 17 is identical in structure and concurrently actuated therewith. As will be better understood from the following discussion, a common control causes synchronous opening or closing of both gripper assemblies 40 and 41.

FIG. 8 shows the hydraulic interconnections and structural support for the lift limb assembly 15. Rigidly attached to the vehicle frame are a pair of roller bearing assemblies 70 and 71. These assemblies are identical and the details of assembly 71 are shown both in the broken section in FIG. 8 and in side section and broken view in FIG. 10. A generally channel-shaped mounting frame 72 including side portions 73 and 74 has a plurality of rollers 75, 76 and 77 pivotally mounted between side walls 73 and 74 to engage the circumference of main shaft 16 at selected points. Accordingly, assembly 15 is securely supported in parallel to the edge of the flatbed 12 of the vehicle by the end caps 80 and 81 as well as by the circumferential chain engagement with sprockets 32 and 33 and the rearward roller bearing support of assemblies 70 and 71.

As is also visible in FIG. 8, each end of main shaft 16 is pivotally mounted within a bearing shaft or cap assembly 80 and 81, respectively. These end cap assemblies 80 and 81 are identical, assembly 80 being shown in partially sectioned and broken view in FIG. 9. End cap assemblies 80 and 81 provide both support for shaft 16 and communication for the hydraulic lines for actuating cylinders 42 and 43. End cap assembly 80 has a shoulder 82 securely mounted to plate 84 which is a rigid extension beam from the vehicle platform. Cap 80 further has a central bore 85 extending thereinto in open communication with radial bore 86. Bore 85 and 86 are externally isolated via set screw 88. Radial bore 86 is coupled to the hydraulic power source from the vehicle and, although not shown in FIGS. 8 and 9, such a connection would typically be similar to that shown in FIG. 4. More particularly, end cap 126 of FIG. 4 is rigidly and non-rotatingly supported by beam 115 from the vehicle bed and hydraulic line 127 from the hydraulic power source on the vehicle is attached via connector 128 in radial relation to cap 126, the full counterpart of caps 80 and 81.

Central bore 85 further communicates with a transverse bore 89 which is sealed by set screw 90. Transverse bore 89 communicates through connectors 91 and 92 with output lines 93 and 54. Output line 54 passes through the length of main shaft 16 and passes upwardly through side arm 18 to ultimately connect with port 52 of hydraulic cylinder 43 as shown in FIG. 11A. As is also visible in FIG. 8, hydraulic line 93 is directed upwardly through lift limb 17 and ultimately connected to port 94 of hydraulic cylinder 42, the direct counterpart of port 52 of cylinder 43. As a result, positive or negative hydraulic pressure applied to radial port 86 is commonly transferred to hydraulic lines 93 and 54 thus concurrently controls ports 52 and 94 of cylinders 42 and 43.

Shaft 16 and its attached lift limbs 17 and 18 are rotatably attached to the inner portion of caps 80 and 81 by bearing arrangements, bearing 95 for the cap 80 being shown in FIG. 9. Note also that end cap 81 likewise has a pair of outlet lines 55 and 96 with outlet line 55 being coupled internally through side arm 18 into inlet port 53 of hydraulic ram 43. Output line 96 from cap 81 passes completely through the interior of main shaft 16 and ultimately is coupled to inlet port 97 of hydraulic ram 42, the direct counterpart of inlet port 53 for hydraulic ram 43. Therefore, any hydraulic pressure introduced to the radial inlet port of cap 81 is commonly coupled to both ports 53 and 97 of rams 42 and 43. Thus, to effect control of rams 42 and 43, hydraulic pressure is applied to one of the radial feed ports for caps 80 and 81 and pressure release is coupled to the opposite radial bore. This effects concurrent opening or closing of the latching fingers for assemblies 40 and 41. Hydraulic lines 54, 55, 93 and 96 are all flexible and of sufficient length to accomodate twisting as a result of rotation of shaft 16 around end caps 80 and 81. This allows stationary to rotary hydraulic interconnection.

An alternate embodiment particularly well suited for handling multiple cargo is illustrated in FIG. 2. Vehicle 100 is equipped with a lift limb assembly 101 mounted with the main trunion or shaft parallel to the flatbed storage area and can be implemented substantially as shown and described hereinbefore. However, vehicle 100 includes an additional lift limb assembly 102 with the trunion or main shaft thereof pivotally attached as at 104. Lift limb assembly 101 is adapted to retrieve cable reel cargo 105 and can effect transferral thereof to assembly 102 as is shown in the phantom view at 106. The lift limb or side arms of assemblies 101 and 102 are arranged so as to overlap so that the spindle for cable reel 105 can be gripped by the terminal gripper assemblies of lift limb assembly 102 when the cable reel is in the 106 position. The lift limb assembly 102 can then be pivoted forwardly on vehicle 100 until the cable reel is in the position as is shown for cable reel 108. The hydraulic control levers for both lift limb assemblies 101 and 102 as well as the latching gripper members thereof preferably are externally accessible such as is shown at panel 109 so that the user can appropriately observe and position the lift limb assemblies for the transferral operations. Accordingly, the vehicle 100 can carry at least two cable reels and possibly even more if multiple reels are mounted on each spindle. Unloading of reels from lift limb assembly 102 is effected by the reverse operation in that the assembly 102 is pivoted rearwardly until the spindle for cable 108 is engaged by the outer latching mechanisms of the lift limbs for assembly 101 after which the cable reel can be transferred to the ground as shown for reel 105. Note that since lift limb assembly 102 does not require pivoting through an angle approaching 180°, lift limb assembly 102 can be implemented by a straightforward offset lever portion with directly coupled hydraulic rams although the rotary control shown in FIG. 1 could likewise be implemented for the transfer lift limb assembly 102 if desired.

An alternate arrangement for converting the linear motivating power available from hydraulic rams to rotary torque for the lift limb assembly is shown in FIG. 4. The trunion or main shaft 110 and its attached extending side arms 112 and 114 are substantially as shown hereinbefore and further are rotatably mounted at the ends thereof as by beam 115. Further, a pair of linear hydraulic rams 116 and 117 are pivotally attached at their rear ends thereof to the main frame of the vehicle. The extension rods or piston elements 118 and 119 thereof are each attached to a yoke assembly 120 and 121, respectively. Yoke assemblies 120 and 121 further are attached to ends of chains 122 and 123 which circumferentially engage sprocket gears 124 and 125. Accordingly, the assembly is pivoted by selectably applying energizing hydraulic pressure and release pressure to cylinders 116 and 117. The same general result is obtainable by omitting yokes 120 and 121 and adding another pair of hydraulic cylinders so that each end of chains 122 and 123 are connected to a separate hydraulic ram piston.

A power winch assembly particularly useful for cable reel control is shown in FIGS. 5 and 7 and an arrangement for pivotally storing this winch assembly is shown in FIG. 6. Base plate 130 has a pair of bearing mount brackets 131 and 132 attached on respective ends thereof and, as shown in partially sectioned view in FIG. 7, has roller sleeves 133 and 134 rotatably mounted in the brackets via conventional ball bearing assemblies. An outer collar 135 provides a guide to restrain the edges of the cable reel which engage the upper surface of roller 133 as well as roller 136. An adjustable mounting bracket 138 has a high torque motor 140 rigidly attached thereon with the output shaft 141 being coupled to drive shaft 142 via chain and sprocket gear assembly 144. Motor 140 is preferably a high torque hydraulic motor although other power source arrangements can be provided and the power coupling can likewise be effected by other arrangements than the chain and sprocket assembly 144. This entire powered winch assembly is positioned on the flatbed of the vehicle at the point of tangential engagement with the cable reels when they are fully loaded onto the vehicle. For instance, referring to FIG. 2, one such roller system could be mounted at 145 and another at 146.

FIG. 6 shows an arrangement wherein a power winch roller assembly 150 substantially like that described hereinbefore for FIGS. 5 and 7 is pivotally attached at a hinge point 152 so that it can be positioned in the storage location in a bay or cavity opening into the platform floor 156 as shown in solid lines in FIG. 6. That is, in this position, lip 153 engages a stop shoulder 154 so that the upper surface 155 is contiguous with the flatbed 156 of the vehicle. The assembly 150 includes a powered motor source 158 which is coupled via chain and sprocket assembly 159 to roller assembly 160.

A stub 162 protrudes from surface 155 of assembly 150 and cooperatively engages a matching hole or opening within the flatbed 156 so as to retain the assembly against lateral motion. As shown generally at 164, the outer circumferential edge of a cable reel engages roller 160 and can be powered to rotate or effected with dynamic braking through the control of motor 158.

Yet another arrangement for pivotally positioning the powered winch rollers into position for controlling a cable reel or into a storage position is shown in FIG. 12. FIG. 12 likewise illustrates a potentially double powered roller arrangement. More particularly, the flatbed 170 of the vehicle has a power winch assembly 172 attached thereto via pivotal mounts at brackets 173 and 174 so that assembly 172 can be placed as shown for controlling the cable reel shown in phantom at 176 or pivoted into the storage position shown in phantom at 175.

Assembly 172 is generally formed in a channel shape arrangement as illustrated with three mounting brackets arrayed on surface 177, only brackets 178 and 179 being visible in FIG. 12. Mounted between brackets 178 and 179 is a roller including circumferential edge engaging portions 182 and 183 which are coupled via a central shaft 184 and powered by motor 185 through a chain and sprocket arrangement 186 similar to that described hereinbefore. Separately rotatably journaled on the other side of mounting bracket 179 is a similar roller assembly 188 with its power source 189. Thus two separate cable reels can be independently controlled with the assembly 172 or the assembly 172 pivoted out of the way into position 175 so that the cable reels such as 176 can rest directly on the storage area of flatbed 170.

FIG. 13 is a schematic diagram of a hydraulic system for controlling both the lift limb latch cylinders and the lift limb rotary cylinders for a double lift limb assembly such as is shown in FIG. 2. Pump 190 draws hydraulic fluid from reservoir 191 through filter 192 and delivers the hydraulic fluid under pressure to inlet line 193. As is conventional, the hydraulic return line 194 is coupled to the input via a pressure release valve 195. The input main hydraulic line 193 is connected in parallel and through check valves into four directional control valves 201–204. Valves 201–204 might typically be of common design and of the type which are commercially available such as from Gresen Manufacturing Company of Minneapolis, Minnesota. Each of valves 201–204 is a four-way, three-position spool for control of double acting cylinders or bidirectional motors. Both work ports 205 and 206 are blocked when the spool is in neutral. By actuation of control lever 208, the valve spool can be moved to cause hydraulic oil flow to be directed from main line 193 into one of work ports 205 or 206. The alternate work port is open to the return line 194 in a parallel circuit. When the actuating lever 208 and thus the connected spool is moved in the opposite direction, the work port 205 and 206 functions are reversed.

Note that the two rear limb latch cylinders 210 and 211 are effectively coupled in parallel with the work ports 205 and 206 of valve 201. Thus common functions are provided as for the latching operation described above since cylinders 210 and 211 are commonly actuated to move in common directions in response to a particular movement of control lever 208. Similar operation is realized for transfer arm latch cylinders 214 and 215 controlled by valve 204.

The rear limb cylinders 220 and 221 are shown effectively connected in series between work ports 222 and 223 of valve 202. Likewise a check valve 224 is included. This arrangement is utilized since the push-pull operation shown generally in FIG. 1 is assumed for the rear limb loading so as to allow substantially 180° rotation of the lift limb assemblies. However, note that the transfer arm cylinders 225 and 226 are effectively coupled in parallel between work ports 227 and 228 of valve 203 since it is assumed that a conventional lever arm actuation is used for the transfer arms which do not require the full 180° range of rotation. Thus, cylinders 225 and 226 can be operated in tandem similar to the lift limb latch cylinders. Obviously the hydraulic controls can be expanded to include additional lift limbs for further cargo transfer and control arrangements or contracted to include the controls for a single lift limb and latch cylinder arrangement.

Figure 14:
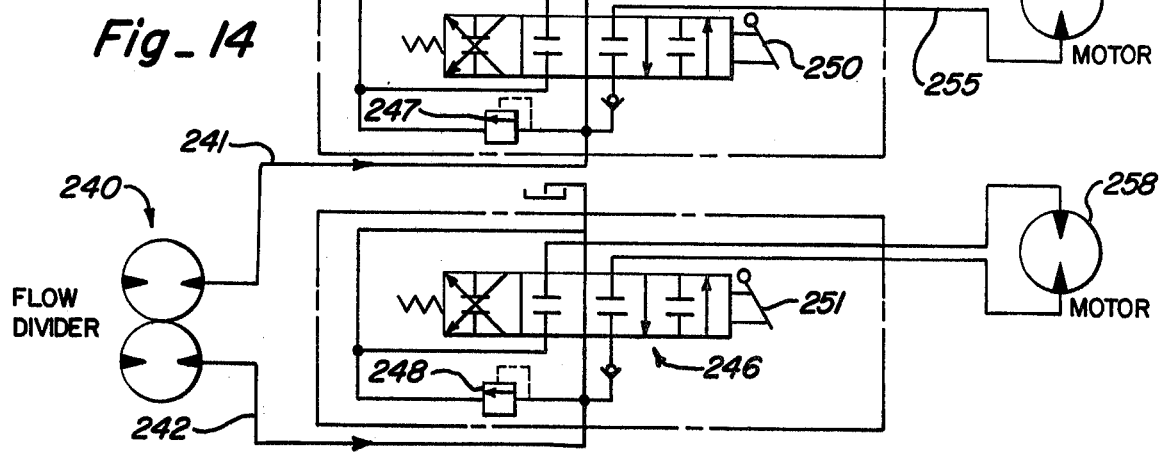
FIG. 14 is a schematic diagram of the hydraulic control circuit for a double hydraulic rotary winch assembly.

FIG. 14 is a schematic diagram of a hydraulic control system for a double power roller apparatus such as that shown in FIGS. 5–7 and 12. Hydraulic pressure from a main source is split at flow divider 240 into separate parallel mains 241 and 242. A pair of directional control valves 245 and 246 are coupled to be energized by respective main lines 241 and 242 and each include pressure relief valves 247 and 248 coupled thereacross. As with the control valves of FIG. 13, selector levers 250 and 251 normally are in a neutral position but actuation in either of two directions effects selection of the flow path between the output work ports thereof. Thus, output lines 254 and 255 are coupled across hydraulic motor 256 thereby permitting selection of the hydraulic pressure differential across motor 256 and thus its direction of rotation. A similar directional flow control for motor 258 is available via appropriate positioning of control lever 251 for valve 246. The system shown in FIG. 14 is accordingly adapted for use with a winch roller for both the forward and rearward cable reels on a double lift limb configuration as shown in FIG. 2 or likewise adaptable for a tandem dem roller configuration such as that shown in FIG. 12.

In a typical implementation of the present invention, the main trunion or pivot shaft 16 is 91.5 inches between ends with 85.5 inches clearance between side arms or lift limbs 17 and 18. The lift limbs are 55 inches in length between the center line of the main shaft and the center of the spindle receiving notches 60 which are of a 1-inch radius. The hydraulic lines positioned within the main shaft and lift limbs are typically ¼ inch NPT-F hydraulic lines and the shaft mounting bearings are McGill No. SB-22310-SS. The bearing shaft end caps 80 and 81 are typically formed with the outer portion of a 5.0 inch outside diameter and 1.0 inch width, mounting shoulder 82 being of a 0.5 inch width and 2.25 inch outside diameter and the rear portion containing the double hydraulic connectors and transverse bore being 1.75 inches long by 1.9865 inches outside diameter. The internal passageways within caps 80 and 81 are 0.25 inch diameter. When used with a double lift limb assembly as shown in FIG. 2, the transfer limb assembly can be dimensioned similarly to the rear mounted lift limb assembly except that the distance between the center line of the pivot shaft and the receiving notch for the spindles can be 63.25 inches. The required overlap for transferring operations can be provided simply by mounting the latch plates on opposite walls of the main limb arms. That is, as seen in FIG. 8, the latch plates for the transfer mechanism might typically be mounted on the outer walls of the side arms instead of the inner walls as shown in FIG. 8 thereby allowing the latch plate assemblies to overlap and effect spindle transfer. The main shaft for both assemblies is typically of an eight-inch outside diameter and the main lift limbs extending therefrom are typically three inches wide and eight inches thick. Note that the transfer limb latch assembly need not include the outer hook lip shown at 50 for FIG. 11A since it is not required to retrieve spindles of cargo from the surface.

The winch assembly of FIGS. 6 and 7 might typically include a base plate of about 45 inches in length and 18 inches in width with the outer rollers 136 and 133 having an outer diameter of 4.5 inches, coupling shaft 142 having an outer diameter of 2.5 inches and the end caps such as 135 having an outer diameter of 5.25 inches. The rollers are typically mounted on a center line approximately 3 inches above the surface of the base plate 130.

For the pivotal latch plates, the spacing between the hydraulic cylinder extender rod pivot pin attachment and the pivotal attachment of the plate to the arm is typically 4.0 inches.

In use in conjunction with a double lift limb arrangement such as shown in FIG. 2, the rear lift limb assembly 101 is pivoted outwardly until the latching members on the terminal ends thereof are at the level of the cargo spindle. For example, the spindles of a small cable reel might be 19 inches above the ground. The cable reel retained within the fingers of the outer gripper assembly is then pivoted upwardly by actuating the driving pistons or hydraulic cylinders for the main shaft chain drive. After the cable reel has reached a point slightly above horizontal, these spindles will fully engage within the internal notches such as 60 in FIG. 11A and the lift limb hydraulic cylinders are actuated to close the gripping latch mechanisms. After powered raising of the lift limbs above a vertical position, the lift limbs are effectively allowed to coast downwardly towards the storage area of the vehicle by permitting oil to transfer between the drive cylinders. The rear lift limb assembly 101 and forward lift limb assembly or transfer assembly 102 are pivoted until they intersect as shown in phantom in FIG. 2 and the spindles are transferred between the latching mechanisms thereof. Assembly 102 is then pivoted forwardly on the vehicle until the cable reel as shown at 108 is in a full rest position against the floor of the storage area.

Preferably, the power roller winch assemblies such as 145 and 146 of FIG. 2 are pivotally mountable so that they can be placed out from under the cable reels during transport. The second reel can be loaded onto lift limb assembly 101 and transferred onto the flatbed storage area. With both winch roller assemblies 145 and 146 pivoted from under the cable reels, the cable reels will be prevented from rotating during transport. Upon reaching the location wherein the reels are to be implemented as by unwinding the cables, the lift limb assemblies 101 and 102 are raised sufficiently to permit pivoting the power roller assemblies 145 and 146 into the operating position wherein the powered rollers thereof circumferentially engage the reels. The cables on these reels can then be independently or concurrently unwound or wound as demand requires through actuation of the hydraulic motors on the roller winch assemblies. Alternatively, if the powered winch rollers are not employed, the lift limb assemblies 101 and/or 102 can be slightly raised or raised to a full vertical position to allow manual withdrawal or winding of the cables on the reels. For unloading, the rear lift limb assembly is pivoted outwardly until its reel is on the surface at which point both latching mechanisms for the lift limbs thereof are released and the reel can be removed. Lift limb assembly 101 is then pivoted into radial intersection with lift limb assembly 102 to effect transfer of the second cable reel from assembly 102 onto assembly 101. Assembly 101 can then be rotated so as to place the second reel on the surface.

From the present invention, substantially automatic loading and handling of cargo is possible from a single control panel which can likewise be conveniently located for visual observance of the operation. Although hydraulically operated latches for securing the cargo spindles have been shown and described, it will be recognized that other forms of latches including manual devices can be included. Further, the transfer limb assembly such as 102 of FIG. 2 could be implemented with a simple outwardly opening notch for receiving the cargo spindle and without any latching mechanism but inclusion of a latching mechanism is preferable for safety purposes. The chain drive loading limbs as shown in this application is particularly advantageous in that it permits pivotal movement of the lift limbs through 180° with a smooth operation and minimum space. Furthermore, the truck frame need not be altered which allows retention of a relatively clean, flat surface in the storage or load area. Each lift limb assembly typically can handle a 10,000 lb. load.

Although the present invention has been described with particularity relative to the foregoing exemplary preferred embodiments, various modifications, changes, additions and applications other than those specifically mentioned herein will be readily apparent to those having normal skill in the art without departing from the spirit of this invention.

What is claimed is:

1. In apparatus for loading and unloading spindle mounted cargo such as cable reels and the like relative to an elevated platform wherein at least one lift assembly includes an elongated shaft having a plurality of arms attached thereto in spaced parallel relation to one another on said shaft with each said arm including means remote from said shaft for receiving a cargo spindle, said arms extending in a common direction perpendicular to the length of said shaft, said shaft having a drive member in radially surrounding relation to the elongated central axis of said shaft, means mounting said shaft with the length thereof parallel to and rotatable with respect to the surface of the flatbed, the improvement comprising:

rotational drive means for controlling the rotational position of said shaft including a drive member for said shaft having a sprocket gear, coupling means including a chain at least partially engaging said sprocket gear, and power source means including a pair of fluid-actuated rams having the pistons thereof connected to respective ends of said chain, and means energizing said rams for establishing synchronous, oppositely directed movement of said ram pistons, said energizing means including flow control means having a source of fluid under pressure establishing communication between said rams whereby fluid exhausted from one ram is applied directly under pressure to said other ram whereby to establish oppositely directed movement of said ram pistons, and bypass means for selectively bypassing fluid exhausted from the one ram to said fluid supply source in excess of that required to establish oppositely directed movement of the other of said ram pistons.

2. In apparatus for loading and unloading at least one cargo reel relative to a flatbed wherein each cargo reel has a lifting spindle thereon, and a plurality of lifting assemblies are arranged in tandem each including an elongated shaft with at least a pair of arms attached thereto in spaced relation to one another along said shaft, said arms being perpendicular to the axial length of said shaft and parallel to one another, said arms each having releasable spindle securing means in proximity to the outer end thereof, means for mounting said shafts for rotary movement about the longitudinal axis thereof relative to the flatbed, said mounting means positioning one of said shafts in proximity to an edge of the flatbed and the others of said shafts in spaced alignment parallel to said one of said shafts with the spacing between said shafts accommodating radial overlap of the movement of said releasable spindle securing means on said arms attached to adjoining said shafts whereby cargo items can be secured by said releasable spindle securing means on said arms of said one of said shafts, rotated over the flatbed and transferred to said releasable spindle securing means on said arms of adjacent said shafts, the improvement comprising:

a plurality of rotary power producing means attached to the flatbed and coupled for introducing power to respective said shafts for rotation thereof about the longitudinal axis of said shafts, said rotary power producing means for at least one of said shafts in radially surrounding relation to the axis thereof, force applying means including a chain interlinked in at least partial circumferentially surrounding relation with the associated said circular gear, and a pair of self-balancing linear fluid-actuated rams with the pistons thereof coupled to opposite ends of said chain including flow control means having a source of fluid under pressure establishing communication between said rams whereby fluid exhausted from one ram is applied directly under pressure to said other ram whereby to establish oppositely directed movement of said ram pistons, and bypass means for selectively bypassing fluid exhausted from the one ram to said fluid supply source in excess of that required to establish oppositely directed movement of the other of said ram pistons.

3. In apparatus in accordance with claim 1 wherein said power source means includes a pair of actuators each including a linearly movable piston member, said coupling means including a pair of chains connected at one end to respective said piston members, and said drive member includes a pair of sprocket gears attached to said shaft, the other ends of said chains being attached to respective said sprocket gears with said chains circumferentially engaging said sprocket gear so that said chains are trained to extend away from said gears at points on opposite sides of the central axis of said shaft.

4. In apparatus in accordance with claim 1 including receiving means on said arms having a plurality of spindle engaging means attached to the outer ends of respective said arms, said engaging means each including an open slot in fixed relation to said arm, a hook pivotally attached to said arm for closing said open slot and means selectably actuable for pivoting said hook between open and closed positions relative to said slot.

5. In apparatus in accordance with claim 4 wherein said spindle engaging means each further includes a hydraulic ram with the body thereof pivotally attached to an associated arm and the piston thereof pivotally attached to the associated hook at a point offset from the pivotal attachment of said hook to said arm.

6. In apparatus in accordance with claim 1 wherein said shaft mounting means rotatably retains said shaft in proximity to an edge of the flatbed so that said lift assembly is pivotable through an arc of at least 180°.

7. In apparatus in accordance with claim 1 which includes a plurality of said lift assemblies arranged in tandem with said shafts thereof rotatably mounted on the flat surface, said assemblies being in parallel spaced relation so that the pivotal arc paths followed by said receiving means intersect between each contiguous pair of said lift assemblies for transferring cargo spindles from the arms of one said lift assembly to the arms of said contiguous lift assembly.

8. In apparatus in accordance with claim 1 which further includes means on the surface of the flatbed positioned for underlying the cargo pivoted over the flatbed by said lift assembly, said underlying means including means for engaging the perimeter of the cargo and means for rotationally moving said engaging means for causing the cargo to rotate about its spindle.

* * * * *

UNITED STATES PATENT OFFICE
CERTIFICATE OF CORRECTION

Patent No. 4,091,946          Dated May 30, 1978

Inventor(s) Robert W. Kraeft and John B. Lloyd

It is certified that error appears in the above-identified patent and that said Letters Patent are hereby corrected as shown below:

IN THE ABSTRACT:

Line 16, cancel "or" and substitute -- for --.

IN THE SPECIFICATION:

Column 3, lines 19 and 20, cancel "accomodate" and substitute -- accommodate --.

Column 5, line 2, after "33" add -- [housing 35 having been omitted from Figure 1] --.

Column 5, line 35, after "spindles" add -- [as will be discussed in greater detail below relative to Figure 11] --.

UNITED STATES PATENT OFFICE
CERTIFICATE OF CORRECTION

Patent No. 4,091,946   Dated May 30, 1978

Inventor(s) Robert W. Kraeft and John B. Lloyd

It is certified that error appears in the above-identified patent and that said Letters Patent are hereby corrected as shown below:

Column 7, line 5, after "16" add -- [note Figure 8] --.

Column 8, line 3, after "180°" add -- [as is the case for assembly 101] --.

Column 10, line 11, after "arrangements" add -- [i.e.: for three or more cable reels] --.

Signed and Sealed this

Twenty-ninth Day of May 1979

[SEAL]

Attest:

RUTH C. MASON
Attesting Officer

DONALD W. BANNER
Commissioner of Patents and Trademarks